US011106419B2

(12) United States Patent
Kimura

(10) Patent No.: US 11,106,419 B2
(45) Date of Patent: Aug. 31, 2021

(54) MULTI-SCREEN DISPLAY ADJUSTING SYSTEM AND MULTI-SCREEN DISPLAY ADJUSTING METHOD

(71) Applicant: Sharp NEC Display Solutions, Ltd., Tokyo (JP)

(72) Inventor: Tatsuo Kimura, Tokyo (JP)

(73) Assignee: SHARP NEC DISPLAY SOLUTIONS, LTD., Tokyo (JP)

( * ) Notice: Subject to any disclaimer, the term of this patent is extended or adjusted under 35 U.S.C. 154(b) by 0 days.

(21) Appl. No.: 17/145,545

(22) Filed: Jan. 11, 2021

(65) Prior Publication Data

US 2021/0173607 A1      Jun. 10, 2021

Related U.S. Application Data

(63) Continuation of application No. PCT/JP2018/026501, filed on Jul. 13, 2018.

(51) Int. Cl.
*H04N 5/445*       (2011.01)
*H04N 5/265*       (2006.01)
(Continued)

(52) U.S. Cl.
CPC .......... *G06F 3/1446* (2013.01); *H04N 5/268* (2013.01); *H04N 5/2628* (2013.01); *H04N 5/44504* (2013.01); *H04N 5/57* (2013.01)

(58) Field of Classification Search
CPC ........ H04N 5/45; H04N 5/2628; H04N 5/268; H04N 5/44504; H04N 5/57; H04N 5/445;
(Continued)

(56) References Cited

U.S. PATENT DOCUMENTS

2003/0112248 A1    6/2003   Pronkine
2011/0090409 A1*   4/2011   Kawasaki .............. G03B 37/04
                                              348/744
(Continued)

FOREIGN PATENT DOCUMENTS

JP    2003-143509 A    5/2003
JP    2005-077859 A    3/2005
(Continued)

OTHER PUBLICATIONS

International Search Report (ISR) (PCT Form PCT/ISA/210), in PCT/JP2018/026501, dated Oct. 16, 2018.

*Primary Examiner* — Sherrie Hsia
(74) *Attorney, Agent, or Firm* — McGinn IP Law Group, PLLC

(57) ABSTRACT

A multi-screen display adjusting system including: a first signal path to which a first video input signal is input and a second signal path to which a second video input signal is input that are independent from each other; a display panel configured to display a first image based on the first video input signal and a second image based on the second video input signal; a screen composing unit configured to determine an arrangement of the first screen and an arrangement of the second screen on the display panel on the basis of an output from the first signal path and an output from the second signal path; a frame memory unit configured to store data of the arrangement of the first screen and data of the arrangement of the second screen; a video output processing unit configured to read the data of the arrangement of the first screen from the frame memory unit and generate a first signal timing for displaying the first screen and read the data of the arrangement of the second screen from the frame memory unit and generate a second signal timing for displaying the second screen; and a control unit.

11 Claims, 7 Drawing Sheets

(51) Int. Cl.
*H04N 5/268* (2006.01)
*H04N 5/57* (2006.01)
*H04N 9/74* (2006.01)
*G06F 3/14* (2006.01)
*H04N 5/262* (2006.01)

(58) Field of Classification Search
CPC ............ H04N 5/265; H04N 5/50; H04N 9/74; H04N 9/76; G06F 3/1446
USPC ......... 348/563–569, 581–584, 588, 598, 599
See application file for complete search history.

(56) References Cited

U.S. PATENT DOCUMENTS

| | | |
|---|---|---|
| 2014/0071099 A1 | 3/2014 | Kubota et al. |
| 2014/0362295 A1 | 12/2014 | Suzuki |

FOREIGN PATENT DOCUMENTS

| | | |
|---|---|---|
| JP | 2006-246019 A | 9/2006 |
| JP | 2010-164901 A | 7/2010 |
| JP | 2013-138348 A | 7/2013 |
| JP | 2014-052930 A | 3/2014 |
| JP | 2015-228588 A | 12/2015 |

* cited by examiner

ONE-SCREEN DISPLAY

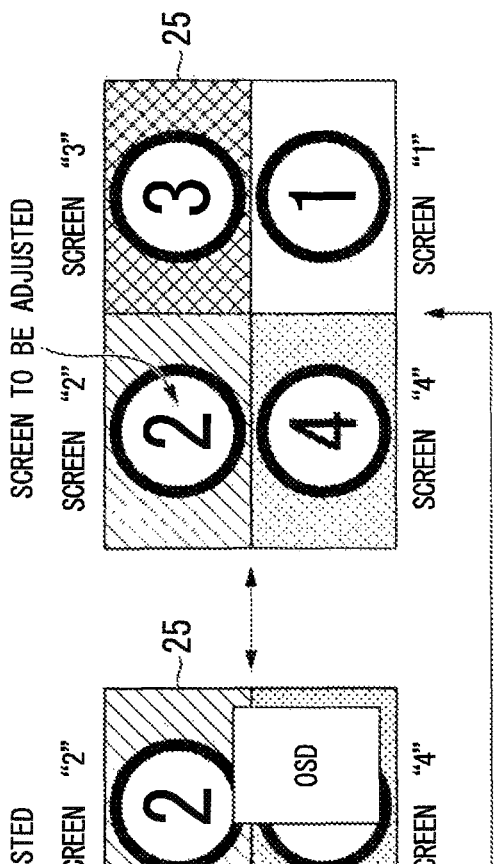
FIG. 3A
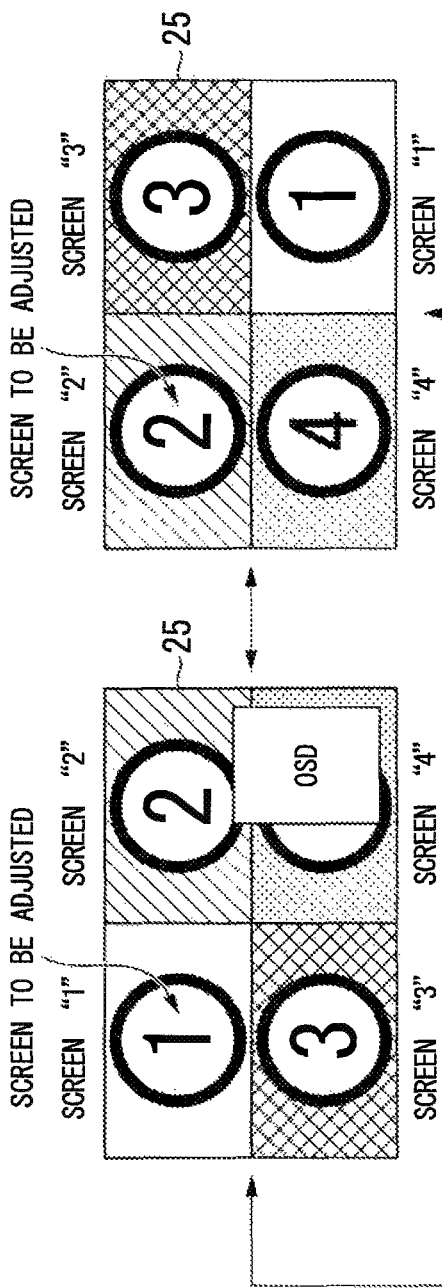
FIG. 3B
FIG. 3C
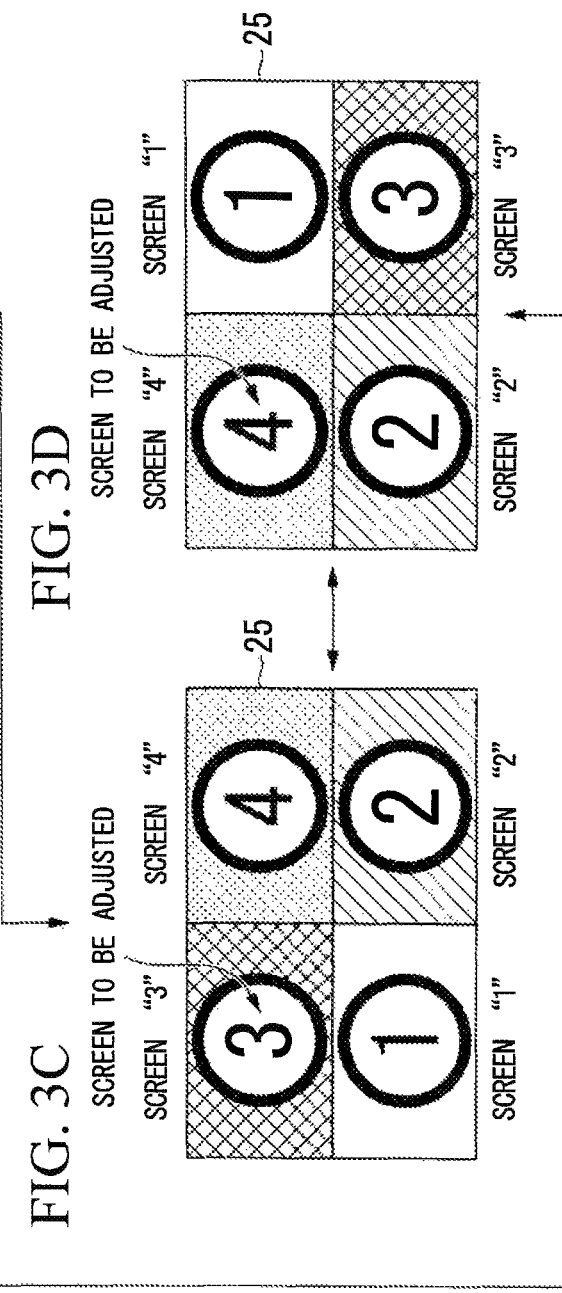
FIG. 3D

SCREEN BASED ON
VIDEO INPUT SIGNAL 1

SCREEN BASED ON
VIDEO INPUT SIGNAL 2

SCREEN BASED ON
VIDEO INPUT SIGNAL 3

SCREEN BASED ON
VIDEO INPUT SIGNAL 4

COMPOSED
SCREEN

FOUR-SCREEN DISPLAY MODE

QUAD LINK MODE

FOUR-SCREEN DISPLAY MODE

QUAD LINK MODE

MULTI-SCREEN DISPLAY ADJUSTING SYSTEM AND MULTI-SCREEN DISPLAY ADJUSTING METHOD

TECHNICAL FIELD

The present invention relates to a multi-screen display adjusting system and a multi-screen display adjusting method.

BACKGROUND ART

Patent Literature 1 discloses a control system in which a screen operation of a remote controller in a multi-screen display is improved.

In the technology disclosed in Patent Literature 1, a plurality of independent program video sources are displayed together on one display device on the basis of a predetermined layout determined in advance. In more detail, processes such as enlargement, reduction, and the like are performed for each of a plurality of independent program video sources, and a plurality of pieces of independent video data after the processes are written into a plurality of independent memories. A composition unit performs reading at an output rate of a display device from such a plurality of independent memories. In addition, the composition unit monitors a plurality of data effective signals read from a plurality of memories and selects and outputs only data of which an effective signal is active. In a case in which two or more effective signals are active at the same time, a control unit sets a priority level of superimposition, which is determined from the screen layout, in the composition unit, and the composition unit selects an input image having a high priority level as an output image.

However, in the technology disclosed in Patent Literature 1, the composition unit reads data from each of a plurality of memories instead of reading data from a memory in which a plurality of pieces of data are arranged. For this reason, in the technology disclosed in Patent Literature 1, there is concern that image adjustment of a displayed video may not be able to be effectively performed.

Patent Literature 2 discloses a display device that performs display based on a plurality of pieces of video data input through a plurality of cables. In the technology disclosed in Patent Literature 2, a multi-window control unit composes multiple windows on the basis of a plurality of pieces of input video data and performs a composition process for a multi-screen display.

However, in Patent Literature 2, a relation between a plurality of pieces of input video data, a composition process for a multi-screen display, and the process of storing data before/after the composition process is not described. For this reason, in the technology disclosed in Patent Literature 2, depending on the relation between a plurality of pieces of input video data, the composition process for a multi-screen display, and the process of storing data before/after the composition process, there is concern that image adjustment of a displayed video may not be able to be performed efficiently.

CITATION LIST

Patent Literature

[Patent Literature 1]
Japanese Unexamined Patent Application, First Publication No. 2006-246019

[Patent Literature 2]
Japanese Unexamined Patent Application, First Publication No. 2013-138348

SUMMARY OF INVENTION

Technical Problem

In view of the problems described above, an object of the present invention is to provide a multi-screen display adjusting system and a multi-screen display adjusting method capable of efficiently performing image adjustment of a displayed video.

Solution to Problem

In order to solve the problems described above, according to one aspect of the present invention, there is provided a multi-screen display adjusting system including: at least a first signal path to which a first video input signal is input and a second signal path to which a second video input signal different from the first video input signal is input that are independent from each other; the first signal path including: a first video input processing unit that performs at least addition of blanking signal to the first video input signal; a first color adjusting unit that performs at least adjustment of contrast on the first video input signal; and a first scaler unit that performs at least size adjustment on the first video input signal, the second signal path including: a second video input processing unit that performs at least addition of blanking signal to the second video input signal; a second color adjusting unit that performs at least adjustment of contrast on the second video input signal; and a second scaler unit that performs at least size adjustment on the second video input signal, a display panel configured to display a first screen that is an image based on the first video input signal and a second screen that is an image based on the second video input signal; a screen composing unit configured to determine an arrangement of the first screen and an arrangement of the second screen on the display panel on the basis of an output from the first signal path and an output from the second signal path; a frame memory unit configured to store data of the arrangement of the first screen and data of the arrangement of the second screen determined by the screen composing unit; a video output processing unit configured to read the data of the arrangement of the first screen from the frame memory unit, generate a first signal timing that is a signal timing for displaying the first screen, read the data of the arrangement of the second screen from the frame memory unit, and generate a second signal timing that is a signal timing for displaying the second screen; and a control unit configured to control the first signal path, the second signal path, the screen composing unit, and the video output processing unit.

According to one aspect of the present invention, there is provided a multi-screen display adjusting method including: performing at least addition of blanking, at least adjustment of contrast, and at least size adjustment on a first video input signal input to a first signal path; performing at least addition of blanking, at least adjustment of contrast, and at least size adjustment on a second video input signal different from the first video input signal input to a second signal path; displaying a first screen that is an image based on the first video input signal and a second screen that is an image based on the second video input signal on a display panel; determining an arrangement of the first screen and an arrangement of the second screen on the display panel on the basis of an output from the first signal path and an output from the second signal path; storing data of the determined arrangement of the first screen and data of the determined arrangement of the second screen in a frame memory unit; reading the data of the arrangement of the first screen from the frame memory unit, generating a first signal timing that is a signal timing for displaying the first screen, reading the data of the arrangement of the second screen from the frame memory unit, and generating a second signal timing that is a signal timing for displaying the second screen; and performing control of the first signal path, control of the second signal path, control of determination of the arrangement of the first screen and the arrangement of the second screen, and control of generation of the first signal timing and generation of the second signal timing Advantageous Effects of Invention According to the present invention, image adjustment of a displayed video can be efficiently performed.

BRIEF DESCRIPTION OF DRAWINGS

FIGS. 3A-3D are diagrams illustrating an example of rotation of display positions of screens in the multi-screen display adjusting system according to the first embodiment.

DESCRIPTION OF EMBODIMENTS

Hereinafter, a multi-screen display adjusting system according embodiments of the present invention will be described with reference to the drawings.

Figure 1:
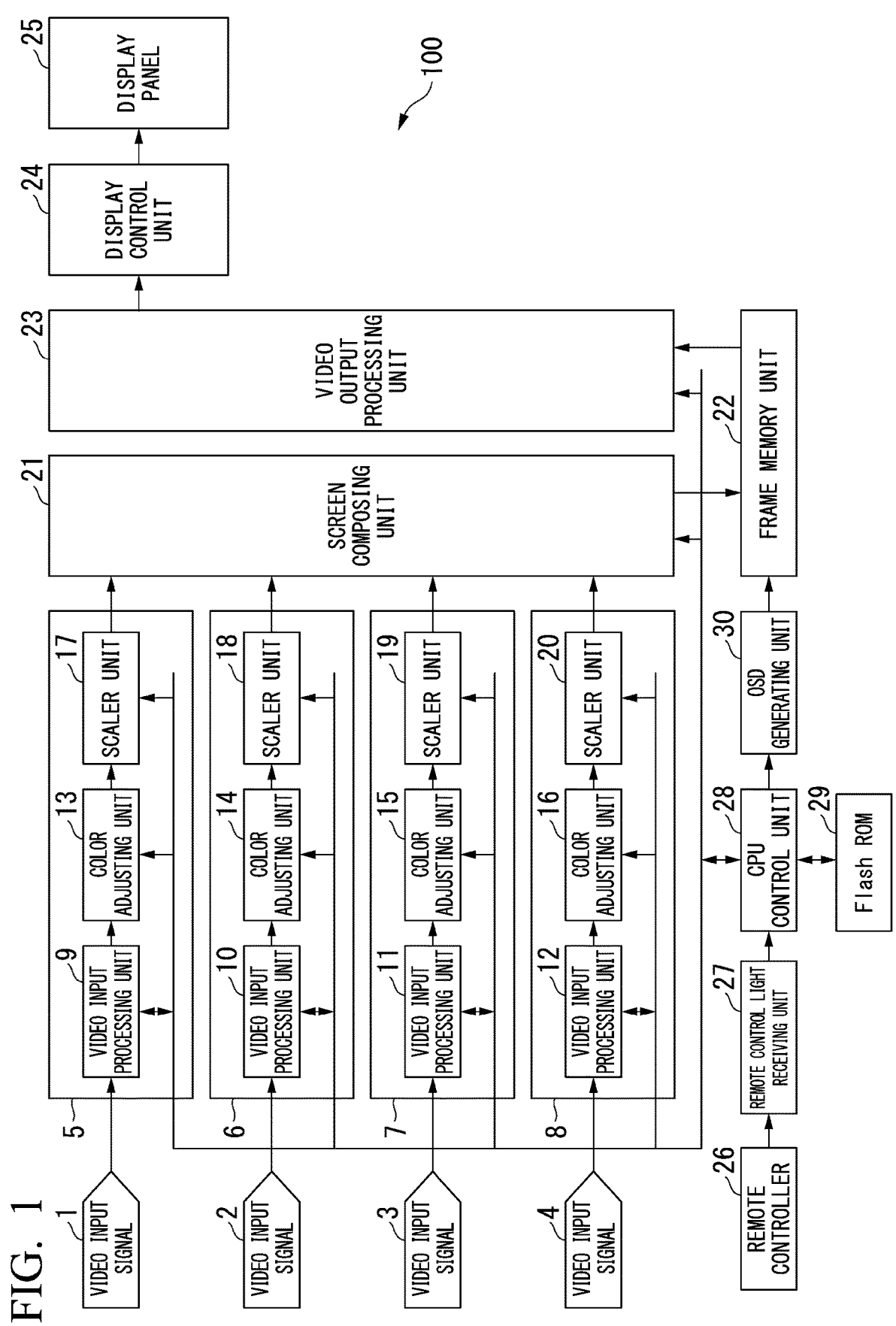
FIG. 1 is a block diagram illustrating an example of a schematic configuration of a multi-screen display adjusting system according to a first embodiment.

FIG. 1 is a block diagram illustrating an example of a schematic configuration of a multi-screen display adjusting system 100 according to a first embodiment.

In the example illustrated in FIG. 1, for example, the multi-screen display adjusting system 100 includes a display panel 25 that can simultaneously display a plurality of videos based on a plurality of video input signals 1, 2, 3, and 4 input from a plurality of external source devices and a display control unit 24 that controls the display panel 25. In addition, the multi-screen display adjusting system 100, for example, independently includes a signal path 5, a signal path 6, a signal path 7, and a signal path 8 and includes a central processing unit (CPU) control unit 28 that controls the signal paths 5, 6, 7, and 8.

A video input signal 1 is input to the signal path 5. The signal path 5 includes a video input processing unit 9, a color adjusting unit 13, and a scaler unit 17.

The video input processing unit 9 performs addition of blanking and the like on the video input signal 1 input to the signal path 5. In more detail, the video input processing unit 9 performs addition of blanking for a screen "1" (see FIGS. 5A-5B) displayed in a display panel 25 on the basis of the video input signal 1. In addition, the video input processing unit 9 also performs measurement of resolution information and the like of an input video, designation of a display range of the video, and the like in addition to the addition of blanking. The video input processing unit 9 is connected to the CPU control unit 28 and is controlled by the CPU control unit 28.

The color adjusting unit 13 performs adjustment of contrast and the like on the video input signal 1. In more detail, the color adjusting unit 13 performs adjustment of contrast on the screen "1" displayed in the display panel 25 on the basis of the video input signal 1. In addition, the color adjusting unit 13 performs adjustment of luminance and the like on the video input signal 1 in addition to the adjustment of contrast. The color adjusting unit 13 is connected to the CPU control unit 28 and is controlled by the CPU control unit 28.

The scaler unit 17 performs size adjustment and the like on the video input signal 1. In more detail, the scaler unit 17 performs size adjustment (enlargement and reduction) on the screen "1" (see FIG. 6) displayed in the display panel 25 on the basis of the video input signal 1. The scaler unit 17 is connected to the CPU control unit 28 and is controlled by the CPU control unit 28.

In the example illustrated in FIG. 1, a process using the video input processing unit 9 is performed on the video input signal 1 input to the signal path 5. Next, a process using the color adjusting unit 13 is performed on the video input signal 1 on which the process using the video input processing unit 9 has been performed. Next, a process using the scaler unit 17 is performed on the video input signal 1 on which the process using the color adjusting unit 13 has been performed. Next, the video input signal 1 on which the process using the scaler unit 17 has been performed is output from the signal path 5.

In the example illustrated in FIG. 1, the process using the video input processing unit 9, the process using the color adjusting unit 13, and the process using the scaler unit 17 are performed in an order of the process using the video input processing unit 9, the process using the color adjusting unit 13, and the process using the scaler unit 17. In another example, the process using the video input processing unit 9, the process using the color adjusting unit 13, and the process using the scaler unit 17 may be performed in an order different from that of the example illustrated in FIG. 1.

A video input signal 2 different from the video input signal 1 is input to the signal path 6. For example, the signal path 6 is configured similar to the signal path 5. In other words, for example, the signal path 6 includes a video input processing unit 10 configured similar to the video input processing unit 9, a color adjusting unit 14 configured similar to the color adjusting unit 13, and a scaler unit 18 configured similar to the scaler unit 17.

The video input processing unit 10 performs addition of blanking and the like on the video input signal 2 input to the signal path 6. The video input processing unit 10 is connected to the CPU control unit 28 and is controlled by the CPU control unit 28.

The color adjusting unit 14 performs adjustment of contrast and the like on the video input signal 2. The color adjusting unit 14 is connected to the CPU control unit 28 and is controlled by the CPU control unit 28.

The scaler unit 18 performs size adjustment and the like on the video input signal 2. The scaler unit 18 is connected to the CPU control unit 28 and is controlled by the CPU control unit 28.

A video input signal 3 different from the video input signals 1 and 2 is input to the signal path 7. For example, the signal path 7 is configured similar to the signal paths 5 and 6. In other words, for example, the signal path 7 includes a video input processing unit 11 configured similar to the video input processing units 9 and 10, a color adjusting unit 15 configured similar to the color adjusting units 13 and 14, and a scaler unit 19 configured similar to the scaler units 17 and 18.

The video input processing unit 11 performs addition of blanking and the like on the video input signal 3 input to the signal path 7. The video input processing unit 11 is connected to the CPU control unit 28 and is controlled by the CPU control unit 28.

The color adjusting unit 15 performs adjustment of contrast and the like on the video input signal 3. The color adjusting unit 15 is connected to the CPU control unit 28 and is controlled by the CPU control unit 28.

The scaler unit 19 performs size adjustment and the like on the video input signal 3. The scaler unit 19 is connected to the CPU control unit 28 and is controlled by the CPU control unit 28.

A video input signal 4 different from the video input signals 1, 2, and 3 is input to the signal path 8. For example, the signal path 8 is configured similar to the signal paths 5, 6, and 7. In other words, for example, the signal path 8 includes a video input processing unit 12 configured similar to the video input processing units 9, 10, and 11, a color adjusting unit 16 configured similar to the color adjusting units 13, 14, and 15, and a scaler unit 20 configured similar to the scaler units 17, 18, and 19.

The video input processing unit 12 performs addition of blanking and the like on the video input signal 4 input to the signal path 8. The video input processing unit 12 is connected to the CPU control unit 28 and is controlled by the CPU control unit 28.

The color adjusting unit 16 performs adjustment of contrast and the like on the video input signal 4. The color adjusting unit 16 is connected to the CPU control unit 28 and is controlled by the CPU control unit 28.

The scaler unit 20 performs size adjustment and the like on the video input signal 4. The scaler unit 20 is connected to the CPU control unit 28 and is controlled by the CPU control unit 28.

Although the multi-screen display adjusting system 100 includes the four signal paths 5, 6, 7, and 8 in the example illustrated in FIG. 1, in another example, the multi-screen display adjusting system 100 may include an arbitrary number (here, two or more) of signal paths other than 4.

Figure 2A:
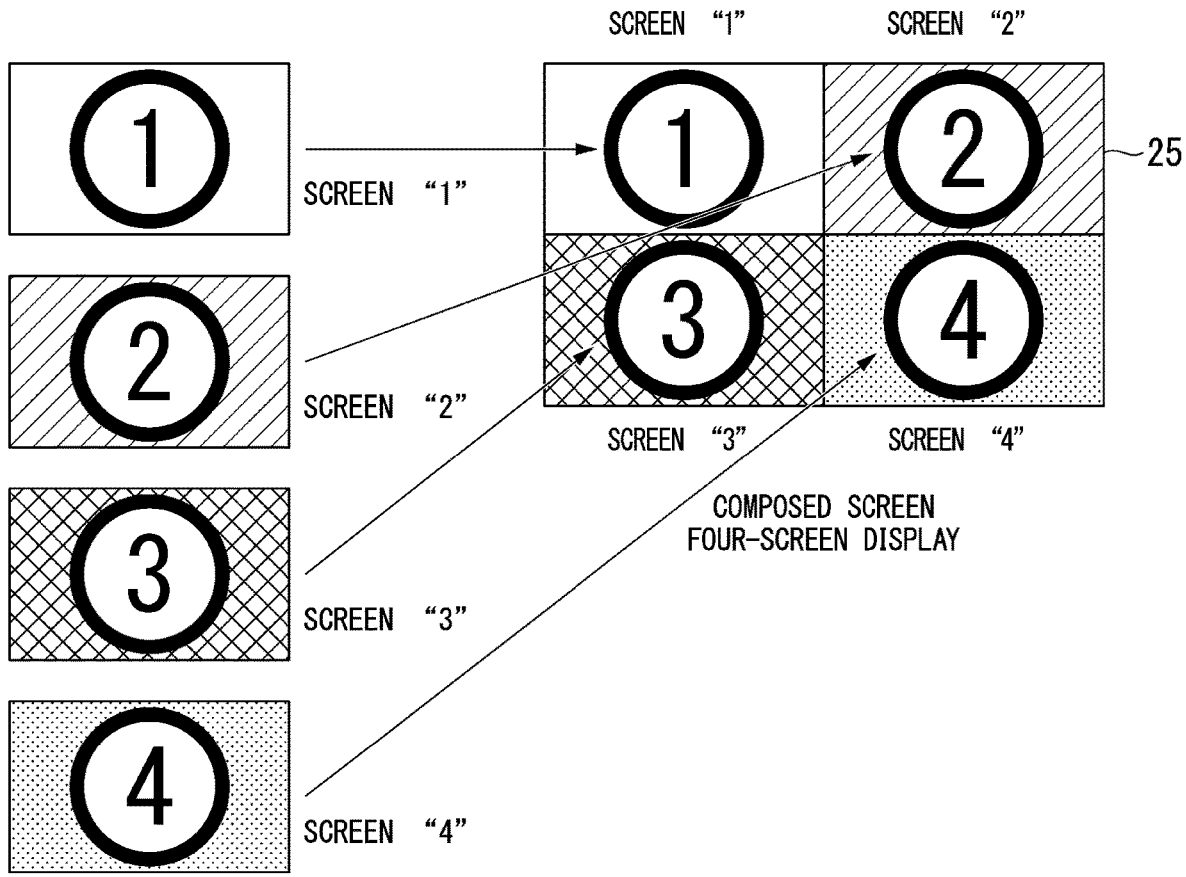
FIGS. 2A-2B are diagrams illustrating an example of a multi-screen display function and the like of the multi-screen display adjusting system according to the first embodiment.

In the example illustrated in FIG. 1, the display panel 25 displays, for example, a screen "1" based on the video input signal 1, for example, a screen "2" (see FIG. 2(A)) based on the video input signal 2, for example, a screen "3" (see FIG. 2(A)) based on the video input signal 3, and, for example, a screen "4" (see FIG. 2(A)) based on the video input signal 4.

In the example illustrated in FIG. 1, the multi-screen display adjusting system 100 further includes a screen composing unit 21, a frame memory unit 22, a video output processing unit 23, a remote controller 26, a remote control light receiving unit 27, a flash ROM 29, and an OSD generating unit 30.

An output signal from the signal path 5, an output signal from the signal path 6, an output signal from the signal path 7, and an output signal from the signal path 8 are input to the screen composing unit 21. The screen composing unit 21 determines arrangement of the screen "1," arrangement of the screen "2," arrangement of the screen "3," and arrangement of the screen "4" on the display panel 25 on the basis of the output signal from the signal path 5, the output signal from the signal path 6, the output signal from the signal path 7, and the output signal from the signal path 8. The screen composing unit 21 is connected to the CPU control unit 28 and is controlled by the CPU control unit 28.

The frame memory unit 22 receives data of the arrangement of the screen "1," data of the arrangement of the screen "2," data of the arrangement of the screen "3," and data of the arrangement of the screen "4," which are determined by the screen composing unit 21, from the screen composing unit 21 and stores the received data. In other words, the frame memory unit 22 receives data of screens composed by the screen composing unit 21 and stores the received data.

The video output processing unit 23 reads the data of the arrangement of the screen "1" from the frame memory unit 22 and generates a signal timing for displaying the screen "1" and reads the data of the arrangement of the screen "2" from the frame memory unit 22 and generates a signal timing for displaying the screen "2." In addition, the video output processing unit 23 reads the data of the arrangement of the screen "3" from the frame memory unit 22 and generates a signal timing for displaying the screen "3" and reads the data of the arrangement of the screen "4" from the frame memory unit 22 and generates a signal timing for displaying the screen "4."

In more detail, the video output processing unit 23 generates signal timings for displaying the screen "1," the screen "2," the screen "3," and the screen "4" as one screen. The video output processing unit 23 is connected to the CPU control unit 28 and is controlled by the CPU control unit 28.

Data of the signal timings generated by the video output processing unit 23 is input to the display control unit 24. The display control unit 24 controls the display panel 25 on the basis of the signal timings generated by the video output processing unit 23, and the display panel 25 displays the screen "1," the screen "2," the screen "3," and the screen "4."

In the example illustrated in FIG. 1, the remote controller 26, for example, accepts an image adjusting operation, for example, performed by a user of the multi-screen display adjusting system 100. For example, the remote controller 26 transmits a remote control signal such as an infrared ray or the like, for example, in accordance with a user's image adjusting operation.

The remote control light receiving unit 27 receives a remote control signal transmitted by the remote controller 26. The remote control signal received by the remote control light receiving unit 27 is input to the CPU control unit 28.

The CPU control unit 28 controls the signal paths 5, 6, 7, and 8, the screen composing unit 21, the video output processing unit 23, and the like on the basis of remote control signals input from the remote control light receiving unit 27. The flash ROM 29 stores setting values and the like used for control performed by the CPU control unit 28.

The on screen display (OSD) generating unit 30 generates an OSD menu arranged on the display panel 25 on the basis of a control signal transmitted from the CPU control unit 28.

The frame memory unit 22 receives and stores data of the OSD menu generated by the OSD generating unit 30. The OSD is a function for displaying a setting screen (an image adjustment menu) of a video display device (the multi-screen display adjusting system 100) on the display panel 25 and accepting a user's operation using the setting screen.

At present, in video display devices such as monitors, projectors, and the like, a demand for video display devices having display panels of high definition of 4K (4096×2160 pixels) and ultra high definition (UHD) (3840×2160 pixels) is increasing. In accordance with implementation of high resolution of display panels of video display devices, a multi-screen display function for simultaneously displaying videos of a plurality of external source devices by dividing one screen is generally used.

Thus, in the multi-screen display adjusting system 100 according to the first embodiment illustrated in FIG. 1, a multi-screen display function for simultaneously displaying the screen "1" based on the video input signal 1, the screen "2" based on the video input signal 2, the screen "3" based on the video input signal 3, and the screen "4" based on the video input signal 4 is provided.

Figure 2B:
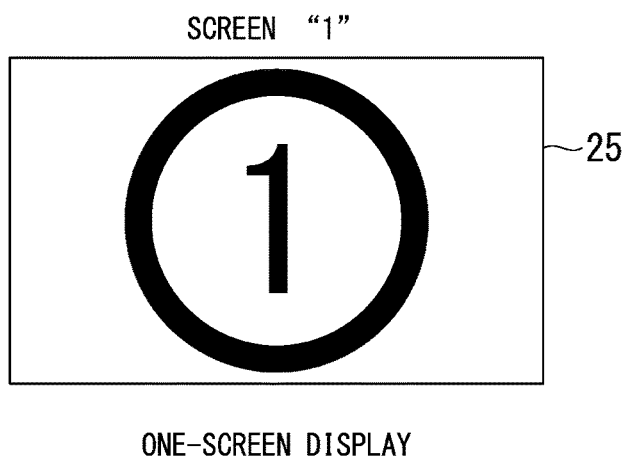

FIGS. 2A-2B are is a diagrams illustrating an example of the multi-screen display function and the like of the multi-screen display adjusting system 100 according to the first embodiment. In more detail, FIG. 2(A) is a diagram illustrating an example of the multi-screen display function of the multi-screen display adjusting system 100 according to the first embodiment. FIG. 2(B) is a diagram illustrating an example of a one-screen display function of the multi-screen display adjusting system 100 according to the first embodiment.

In the example illustrated in FIG. 2(A), a four-screen display based on video input signals 1, 2, 3, and 4 is performed. The screen composing unit 21 composes a screen "1" based on a video input signal 1, a screen "2" based on a video input signal 2, a screen "3" based on a video input signal 3, and a screen "4" based on a video input signal 4. In more detail, the screen composing unit 21 arranges the screen "1" on an upper left side of the display panel 25, arranges the screen "2" on an upper right side of the display panel 25, arranges the screen "3" on a lower left side of the display panel 25, and arranges the screen "4" on a lower right side of the display panel 25.

As a connection means for inputting video signals (the video input signals 1, 2, 3, and 4) output from external source devices to the multi-screen display adjusting system 100 according to the first embodiment functioning as a video display device, for example, High-Definition Multimedia Interface (HDMI) (registered trademark), DisplayPort, Serial Digital Interface (SDI), and the like are used. Video signals of high resolution such as 4K and UHD are very high-speed signals. Thus, in a case in which a video signal of high resolution is transmitted, the video signal of the high resolution is divided into a plurality of video input signals 1, 2, 3, and 4. In addition, the plurality of video input signals 1, 2, 3, and 4 are transmitted to the multi-screen display adjusting system 100 using a plurality of cables. The multi-screen display adjusting system 100 receives the plurality of video input signals 1, 2, 3, and 4. The screen composing unit 21 composes the screen "1" based on the video input signal 1, the screen "2" based on the video input signal 2, the screen "3" based on the video input signal 3, and the screen "4" based on the video input signal 4 into one screen. The display panel 25 displays the one screen composed by the screen composing unit 21.

For example, in a system called a dual link, an external source device evenly divides a video signal of high resolution into left and right signals as two signals. The external source device inputs video input signals divided as the two signals to the video display device (the multi-screen display adjusting system 100) using two cables.

For example, in a system called a quad link, an external source device divides a video signal of high resolution into an upper left part, an upper right part, a lower left part, and a lower right part as four parts. The external source device inputs video input signals divided as the four signals to the video display device (the multi-screen display adjusting system 100) using four cables.

For example, in the case of a UHD signal, one signal of the dual link is 1920×2160 pixels, and one signal of the quad link is Full High Definition (FHD) (1920×1080 pixels). Here, a transmission system for a video signal of high resolution using a plurality of cables will be referred to as a link mode. The multi-screen display function and the link mode coincide with each other in that a plurality of video input signals are received by a video display device and are configured to form one screen through composition.

The video display device (the multi-screen display adjusting system 100), for example, includes a plurality of HDMI input terminals (not illustrated in the drawing), a plurality of DisplayPort input terminals (not illustrated in the drawing), a plurality of SDI input terminals (not illustrated in the drawing), and the like.

For example, in a case in which a four-screen display illustrated in FIG. 2(A) is performed (in other words, the multi-screen display adjusting system 100 has a four-screen display mode), a user can individually select an input terminal of the video input signal 1, an input terminal of the video input signal 2, an input terminal of the video input signal 3, and an input terminal of the video input signal 4.

Also at the time of the link mode, the same operation of selecting an input terminal as that at the time of the four-screen display is used. For example, at the time of the quad link, a user may individually select an input terminal of the upper left screen, an input terminal of the upper right screen, an input terminal of the lower left screen, and an input terminal of the lower right screen.

For example, in an example in which there are four HDMI input terminals in a video display device, when the quad link is to be realized using these four HDMI input terminals, there is no need to check cables to which four inputs of the upper left screen, the upper right screen, the lower left screen, and the lower right screen are assigned in a stage for inserting the cables. In this example, after the upper left screen, the upper right screen, the lower left screen, and the lower right screen are displayed, selection of an input terminal may be performed.

For example, when the multi-screen display function illustrated in FIG. 2(A) is used and a plurality of videos are simultaneously displayed in the display panel 25, there are cases in which image adjustment is performed for one of a plurality of screens "1," "2," "3," and "4." In such cases, generally, a method of displaying and operating an image adjustment menu using an OSD and a method of directly operating a button (not illustrated in the drawing) of the remote controller 26 are used.

In a case in which a multi-screen display is performed as in the example illustrated in FIG. 2(A), an image adjustment menu for each of the screens "1," "2," "3," and "4" needs to be prepared, or buttons of the remote controller 26 that can operate for each of the screens "1," "2," "3," and "4" need to be prepared.

There is a problem in that the number of image adjustment menus or the number of buttons of the remote controller 26 increases in accordance with an increase in the number of screens that can be displayed in the display panel 25 or the number of items of image adjustment. In addition, there is also a problem in that it is difficult to intuitively understand which image adjustment menu or which button of the remote controller 26 is preferably used when image adjustment is performed for one screen among the plurality of screens "1," "2," "3," and "4."

In order to solve these problems, by allowing display positions of the plurality of screens "1," "2," "3," and "4" to be rotatable and causing image adjustment to be performed for a screen arranged on the upper left side of the display panel 25 (in the example illustrated in FIG. 2(A), the screen "1"), an increase in the number of image adjustment menus or the number of buttons of the remote controller 26 can be inhibited, and a screen for which the image adjustment is performed can be easily understood intuitively.

In other words, in the multi-screen display adjusting system 100 according to the first embodiment, by rotating the display position of the screen "1," the display position of the screen "2," the display position of the screen "3," and the display position of the screen "4" on the display panel 25 by using the screen composing unit 21, the arrangement of the screen "1," the arrangement of the screen "2," the arrangement of the screen "3," and the arrangement of the screen "4" on the display panel 25 are changed.

FIGS. 3A-3D are diagrams illustrating an example of rotation of display positions of screens "1," "2," "3," and "4" in the multi-screen display adjusting system 100 according to the first embodiment.

In the example illustrated in FIGS. 3A-3D, a four-screen display including the screen "1," the screen "2," the screen "3," and the screen "4" is performed. In more detail, the screen "1," the screen "2," the screen "3," and the screen "4" are composed, and one screen is displayed in the display panel 25. The screen "1" is a screen that is based on a video input signal 1 processed in a signal path 5. The screen "2" is a screen that is based on a video input signal 2 processed in a signal path 6. The screen "3" is a screen that is based on a video input signal 3 processed in a signal path 7. The screen "4" is a screen that is based on a video input signal 4 processed in a signal path 8.

On the screen illustrated in FIG. 3(A), the screen "1" is arranged on the upper left side of the display panel 25, the screen "2" is arranged on the upper right side of the display panel 25, the screen "3" is arranged on the lower left side of the display panel 25, and the screen "4" is arranged on the lower right side of the display panel 25 by the screen composing unit 21.

When rotation of display positions is performed for the screen illustrated in FIG. 3(A), the screen illustrated in FIG. 3(A) is switched to a screen illustrated in FIG. 3(B) or a screen illustrated in FIG. 3(D).

On the screen illustrated in FIG. 3(B), the screen "2" is arranged on the upper left side of the display panel 25, the screen "3" is arranged on the upper right side of the display panel 25, the screen "4" is arranged on the lower left side of the display panel 25, and the screen "1" is arranged on the lower right side of the display panel 25 by the screen composing unit 21.

When rotation of display positions is performed for the screen illustrated in FIG. 3(B), the screen illustrated in FIG. 3(B) is switched to a screen illustrated in FIG. 3(C) or the screen illustrated in the FIG. 3(A).

On the screen illustrated in FIG. 3(C), the screen "3" is arranged on the upper left side of the display panel 25, the screen "4" is arranged on the upper right side of the display panel 25, the screen "1" is arranged on the lower left side of the display panel 25, and the screen "2" is arranged on the lower right side of the display panel 25 by the screen composing unit 21.

When rotation of display positions is performed for the screen illustrated in FIG. 3(C), the screen illustrated in FIG. 3(C) is switched to a screen illustrated in FIG. 3(D) or the screen illustrated in FIG. 3(B).

On the screen illustrated in FIG. 3(D), the screen "4" is arranged on the upper left side of the display panel 25, the screen "1" is arranged on the upper right side of the display panel 25, the screen "2" is arranged on the lower left side of the display panel 25, and the screen "3" is arranged on the lower right side of the display panel 25 by the screen composing unit 21.

When rotation of display positions is performed for the screen illustrated in FIG. 3(D), the screen illustrated in FIG. 3(D) is switched to the screen illustrated in FIG. 3(A) or the screen illustrated in FIG. 3(C).

For example, when the screen illustrated in FIG. 3(A) is displayed, in a case in which the CPU control unit 28 receives a command of image adjustment (for example, adjustment of addition and the like of blanking performed by the video input processing units 9, 10, 11, and 12, adjustment of contrast and the like performed by the color adjusting units 13, 14, 15, and 16, adjustment of a size performed by the scaler units 17, 18, 19, and 20, and the like), the CPU control unit 28 performs image adjustment of the screen "1" arranged on the upper left side of the display panel 25. In more detail, the CPU control unit 28 performs control of the signal path 5 (the video input processing unit 9, the color adjusting unit 13, and the scaler unit 17).

For example, in a case in which the CPU control unit 28 receives a command of image adjustment when the screen illustrated in FIG. 3(B) is displayed, the CPU control unit 28 performs image adjustment of the screen "2" arranged on the upper left side of the display panel 25. In more detail, the CPU control unit 28 performs control on a signal path 6 (the video input processing unit 10, the color adjusting unit 14, and the scaler unit 18).

For example, in a case in which the CPU control unit 28 receives a command of image adjustment when the screen illustrated in FIG. 3(C) is displayed, the CPU control unit 28 performs image adjustment of the screen "3" arranged on the upper left side of the display panel 25. In more detail, the CPU control unit 28 performs control on a signal path 7 (the video input processing unit 11, the color adjusting unit 15, and the scaler unit 19).

For example, in a case in which the CPU control unit 28 receives a command of image adjustment when the screen illustrated in FIG. 3(D) is displayed, the CPU control unit 28 performs image adjustment of the screen "4" arranged on the upper left side of the display panel 25. In more detail, the CPU control unit 28 performs control on a signal path 8 (the video input processing unit 12, the color adjusting unit 16, and the scaler unit 20).

In other words, in the example illustrated in FIGS. 3A-3D, the upper left position of the display panel 25 is set as image adjustment positions of the screen "1," the screen "2," the screen "3," and the screen "4."

In other words, in a case in which the display position of the screen "1" is located at the image adjustment position (the upper left position of the display panel 25), the screen "1" is an "adjustment screen (a target screen of image adjustment)" (see FIG. 3(A)), and the CPU control unit 28 performs control on the signal path 5. In a case in which the display position of the screen "2" is located at the image adjustment position, the screen "2" is the "adjustment screen" (see FIG. 3(B)), and the CPU control unit 28 performs control on the signal path 6. In a case in which the display position of the screen "3" is located at the image adjustment position, the screen "3" is the "adjustment screen" (see FIG. 3(C)), and the CPU control unit 28 performs control on the signal path 7. In a case in which the display position of the screen "4" is located at the image adjustment position, the screen "4" is the "adjustment screen" (see FIG. 3(D)), and the CPU control unit 28 performs control on the signal path 8.

In the example illustrated in FIGS. 3A-3D, for example, after image adjustment of the screen "1" arranged on the upper left side of the display panel 25 is performed when the screen illustrated in FIG. 3(A) is displayed, rotation of the display position is performed, and, even when the screen illustrated in FIG. 3(A) is switched to, for example, the screen illustrated in the FIG. 3(B), a result of the image adjustment performed on the screen "1" is maintained.

In other words, after the CPU control unit 28 performs control on the signal path 5 in a state in which the display position of the screen "1" is the image adjustment position (the state illustrated in FIG. 3(A)), in a case in which the display position of the screen "1" is rotated to the position of the screen "1" illustrated in FIG. 3(B) or the position of the screen "1" illustrated in FIG. 3(D), a result of the image adjustment performed on the screen "1" in the state illustrated in FIG. 3(A) is maintained also after the display position of the screen "1" is rotated.

In addition, after the CPU control unit 28 performs control on the signal path 6 in a state in which the display position of the screen "2" is the image adjustment position (the state illustrated in FIG. 3(B)), in a case in which the display position of the screen "2" is rotated to the position of the screen "2" illustrated in FIG. 3(C) or the position of the screen "2" illustrated in FIG. 3(A), a result of the image adjustment performed on the screen "2" in the state illustrated in FIG. 3(B) is maintained also after the display position of the screen "2" is rotated.

In addition, in the example illustrated in FIGS. 3A-3D, after the CPU control unit 28 performs control on the signal path 7 in a state in which the display position of the screen "3" is the image adjustment position (the state illustrated in FIG. 3(C)), in a case in which the display position of the screen "3" is rotated to the position of the screen "3" illustrated in FIG. 3(D) or the position of the screen "3" illustrated in FIG. 3(B), a result of the image adjustment performed on the screen "3" in the state illustrated in FIG. 3(C) is maintained also after the display position of the screen "3" is rotated.

In addition, after the CPU control unit 28 performs control on the signal path 8 in a state in which the display position of the screen "4" is the image adjustment position (the state illustrated in FIG. 3(D)), in a case in which the display position of the screen "4" is rotated to the position of the screen "4" illustrated in FIG. 3(A) or the position of the screen "4" illustrated in FIG. 3(C), a result of the image adjustment performed on the screen "4" in the state illustrated in FIG. 3(D) is maintained also after the display position of the screen "4" is rotated.

In the example illustrated in FIGS. 3A-3D, the CPU control unit 28 stores the position of rotation and a setting value of image adjustment of each of the screens "1," "2," "3," and "4" in the flash ROM 29. For this reason, even in a case in which a user turns off the power of the video display device (the multi-screen display adjusting system 100) and then turns on the power thereof again, the video display device (the multi-screen display adjusting system 100) can maintain the same state as that before the turning off of the power.

In the example illustrated in FIGS. 3A-3D, in a case in which the CPU control unit 28 performs image adjustment, the OSD generating unit 30 arranges the OSD menu (the image adjustment menu) on the display panel 25 while avoiding the image adjustment position (an upper left position) of the display panel 25. In other words, in a case in which the CPU control unit 28 performs image adjustment, the OSD menu is arranged at a position (in the example illustrated in FIG. 3(A), a lower right position) not overlapping the upper left position of the display panel 25. For this reason, even in a case in which image adjustment of any one screen among the screens "1," "2," "3," and "4" is performed, a user can perform image adjustment while viewing the entire screen that is a target for the image adjustment.

The rotation illustrated in FIGS. 3A-3D is performed, for example, using an arrow button (not illustrated in the drawing) of the remote controller 26 operating the OSD. For example, in a case in which a left arrow button (not illustrated in the drawing) is operated by a user, the screen illustrated in FIG. 3(A) is switched to the screen illustrated in FIG. 3(B). For example, in a case in which a right arrow button (not illustrated in the drawing) is operated by a user, the screen illustrated in FIG. 3(A) is switched to the screen illustrated in FIG. 3(D).

In the example illustrated in FIG. 3A-3D, in a case in which a change from a multi-screen display (for example, a display state illustrated in FIG. 3(A)) to a normal one-screen display (for example, a display state of one-screen display illustrated in FIG. 2(B)) is performed, an upper left screen in the multi-screen display (for example, the screen "1" illustrated in FIG. 3(A)) is displayed in the one-screen display after the change.

In more detail, the CPU control unit 28 performs switching from the state illustrated in FIG. 3(A) in which the screens "1," "2," "3," and "4" are displayed in the display panel 25 to a display state of the one-screen display illustrated in FIG. 2(B) in which only one screen is displayed in the display panel 25 in accordance with a user' operation. In the case, the CPU control unit 28 displays the screen "1" arranged at the image adjustment position (the upper left position) in the state illustrated in FIG. 3(A) in a display state (see FIG. 2(B)) of the one-screen display on the display panel 25 after switching.

In addition, the CPU control unit 28 performs switching from a state illustrated in FIG. 3(B) in which the screens "1," "2," "3," and "4" are displayed on the display panel 25 to a display state (not illustrated in the drawing) of the one-screen display in which only one screen is displayed on the display panel 25 in accordance with a user's operation. In the case, the CPU control unit 28 displays the screen "2" arranged at the image adjustment position (the upper left position) in the state illustrated in FIG. 3(B) in a display state of the one-screen display on the display panel 25 after performing switching.

In addition, the CPU control unit 28 performs switching from a state illustrated in FIG. 3(C) in which the screens "1," "2," "3," and "4" are displayed on the display panel 25 to a display state (not illustrated in the drawing) of the one-screen display in which only one screen is displayed on the display panel 25 in accordance with a user's operation. In the case, the CPU control unit 28 displays the screen "3"

arranged at the image adjustment position (the upper left position) in the state illustrated in FIG. 3(C) in a display state of the one-screen display on the display panel 25 after performing switching.

In addition, the CPU control unit 28 performs switching from a state illustrated in FIG. 3(D) in which the screens "1," "2," "3," and "4" are displayed on the display panel 25 to a display state (not illustrated in the drawing) of the one-screen display in which only one screen is displayed on the display panel 25 in accordance with a user's operation. In the case, the CPU control unit 28 displays the screen "4" arranged at the image adjustment position (the upper left position) in the state illustrated in FIG. 3(D) in a display state of the one-screen display on the display panel 25 after performing switching.

For this reason, compared to a case in which such switching is not performed, user's convenience can be improved.

At the time of the link mode, a display method used in the video display device (the multi-screen display adjusting system 100) is the same as that of the multi-screen display.

In a case in which the multi-screen display is performed by the video display device (the multi-screen display adjusting system 100), the image adjustment described above is performed on only one of the screens "1," "2," "3," and "4."

On the other hand, when the video display device (the multi-screen display adjusting system 100) is in the link mode using a plurality of cables, image adjustment is performed on one screen composed by the screen composing unit 21.

FIGS. 4A-4E are diagrams illustrating an example of a quad link system.

Figure 4A:
FIGS. 4A-4E are diagrams illustrating an example of a quad link system.
Figure 4B:
Figure 4C:
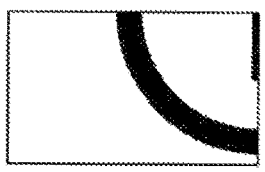
Figure 4D:
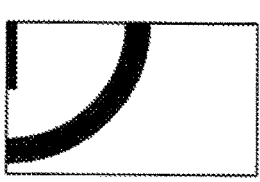
Figure 4E:
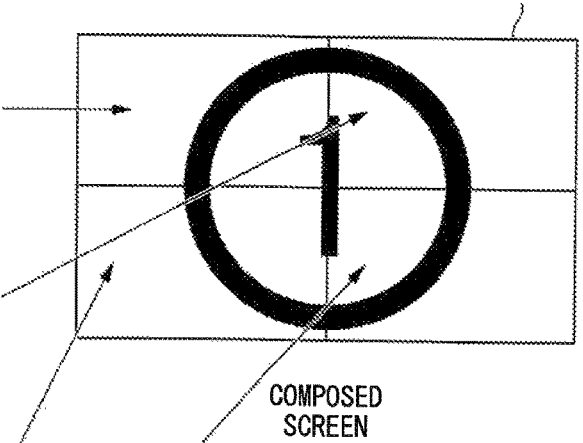

In the example illustrated in FIGS. 4A-4E, when the video display device (the multi-screen display adjusting system 100) is in the quad link mode using four cables (in other words, the multi-screen display adjusting system 100 has a quad link mode), the screen composing unit 21 arranges a screen of an image (see FIG. 4(A)) based on a video input signal 1 output from a signal path 5 on an upper left side of the display panel 25 (see FIG. 4(E)). In addition, the screen composing unit 21 arranges a screen of an image (see FIG. 4(B)) based on a video input signal 2 output from a signal path 6 on an upper right side of the display panel 25 (see FIG. 4(E)). Furthermore, the screen composing unit 21 arranges a screen of an image (see FIG. 4(C)) based on a video input signal 3 output from a signal path 7 on a lower left side of the display panel 25 (see FIG. 4(E)). In addition, the screen composing unit 21 arranges a screen of an image (see FIG. 4(D)) based on a video input signal 4 output from a signal path 8 on a lower right side of the display panel 25 (see FIG. 4(E)). Furthermore, the screen composing unit 21 composes the screen illustrated in FIG. 4(A), the screen illustrated in FIG. 4(B), the screen illustrated in FIG. 4(C), and the screen illustrated in FIG. 4(D) into one screen (see FIG. 4(E)). The display panel 25 displays one screen composed by the screen composing unit 21.

Figure 5A:
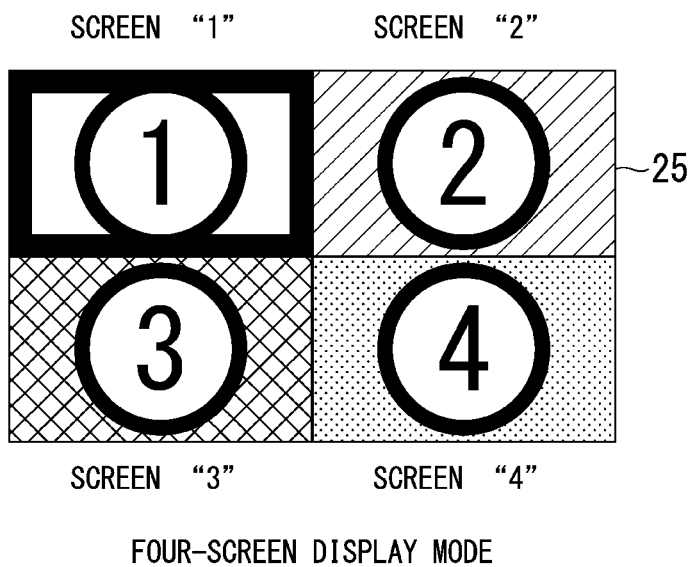
FIGS. 5A-5B are diagrams illustrating an example of blanking adjustment performed by video input processing units.
Figure 5B:
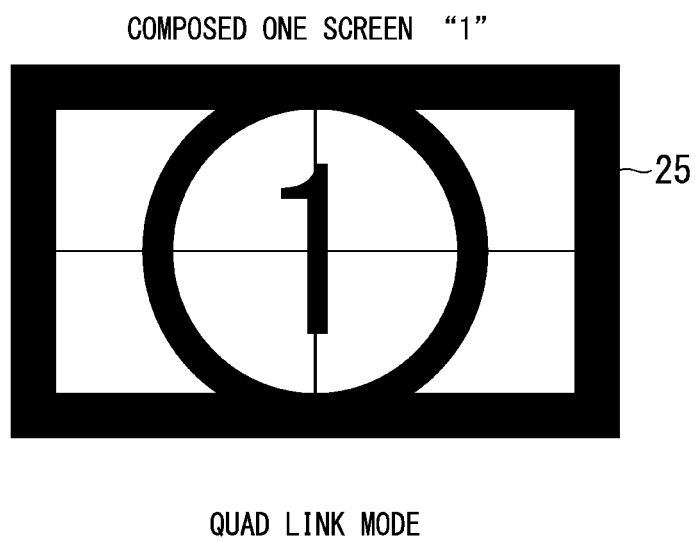

FIGS. 5A-5B are diagrams illustrating an example of blanking adjustment performed by the video input processing units 9, 10, 11, and 12. In more detail, FIG. 5(A) illustrates an example in which the video input processing unit 9 performs blanking adjustment in a four-screen display mode. FIG. 5(B) illustrates an example in which the video input processing units 9, 10, 11, and 12 perform blanking adjustment in a quad link mode.

In the example illustrated in FIG. 5(A), blanking adjustment is performed for one screen "1" arranged on an upper left side of the display panel 25 in the four-screen display mode. In more detail, only the video input processing unit 9 adds blanking of an upper end, a lower end, a left end, and a right end of the screen "1" by designating a display range of the upper end, the lower end, the left end, and the right end of a video input signal 1.

In the example illustrated in FIG. 5(B), in the quad link mode, blanking adjustment is performed for the composed one screen "1." In more detail, the video input processing unit 9 and the video input processing unit 10 add blanking of the upper end of the composed one screen "1." The video input processing unit 11 and the video input processing unit 12 add blanking of the lower end of the composed one screen "1." The video input processing unit 9 and the video input processing unit 11 add blanking of the left end of the composed one screen "1." The video input processing unit 10 and the video input processing unit 12 add blanking of the right end of the composed one screen "1."

In the four-screen display mode, in a case in which color adjustment of contrast, luminance, and the like is performed, the color adjustment of contrast, luminance, and the like is performed on one screen (for example, the screen "1") arranged on the upper left side of the display panel 25. In a case in which the screen "1" is arranged on the upper left side of the display panel 25, only the color adjusting unit 13 performs the color adjustment of contrast, luminance, and the like on the video input signal 1.

On the other hand, in the quad link mode, in a case in which color adjustment of contrast, luminance, and the like is performed, the color adjustment of contrast, luminance, and the like is performed on composed one screen (for example, the screen "1"). In more detail, the color adjusting unit 13 performs color adjustment of contrast, luminance, and the like on a video input signal 1, the color adjusting unit 14 performs color adjustment of contrast, luminance, and the like on a video input signal 2, the color adjusting unit 15 performs color adjustment of contrast, luminance, and the like on a video input signal 3, and the color adjusting unit 16 performs color adjustment of contrast, luminance, and the like on a video input signal 4.

Figure 6A:
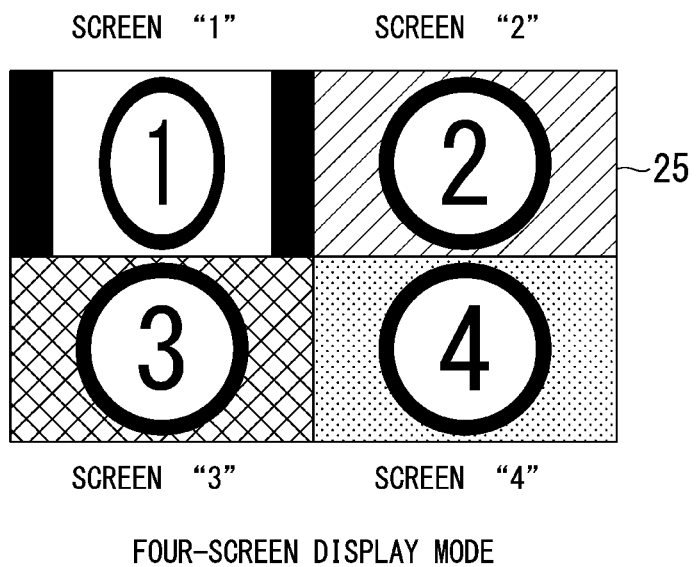
FIGS. 6A-6B are diagrams illustrating an example of size adjustment performed by scaler units.
Figure 6B:
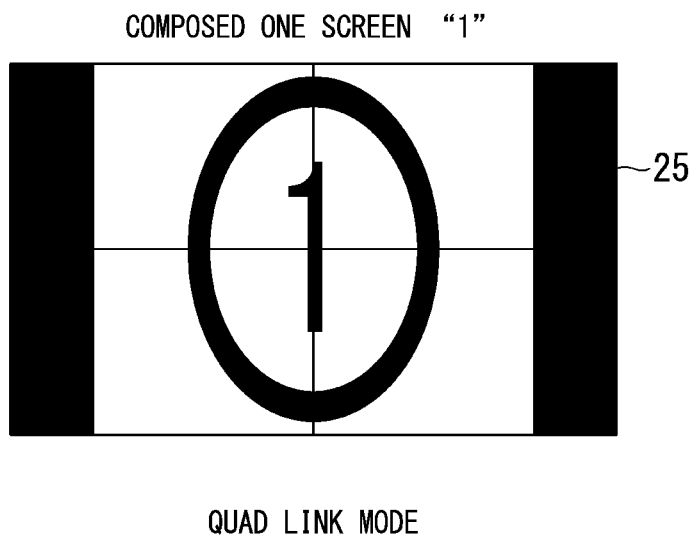

FIGS. 6A-6B are diagrams illustrating an example of size adjustment performed by the scaler units 17, 18, 19, and 20. In more detail, FIG. 6(A) illustrates an example in which the scaler unit 17 performs adjustment of an aspect ratio in the four-screen display mode. FIG. 6(B) illustrates an example in which the scaler units 17, 18, 19, and 20 perform adjustment of an aspect ratio in the quad link mode.

In the example illustrated in FIG. 6(A), in the four-screen display mode, size adjustment (aspect ratio adjustment) is performed on one screen "1" arranged on the upper left side of the display panel 25. In more detail, only the scaler unit 17 performs size adjustment (aspect ratio adjustment) on the video input signal 1. The screen "1" is arranged at the center of display areas acquired by dividing the display panel 25 into four parts using the screen composing unit 21.

In the example illustrated in FIG. 6(B), in the quad link mode, size adjustment (aspect ratio adjustment) is performed on one composed screen "1." In more detail, the scaler unit 17 performs size adjustment on the video input signal 1, the scaler unit 18 performs size adjustment on the video input signal 2, the scaler unit 19 performs size adjustment on the video input signal 3, and the scaler unit 20 performs size adjustment on the video input signal 4. The scaler units 17, 18, 19, and 20 designate the same aspect ratio, and screens adjacent to each other are arranged to be in contact with each other by the screen composing unit 21.

The display method used by the video display device (the multi-screen display adjusting system 100) in the four-screen display mode and the display method used by the video display device in the link mode coincide with each other in that one screen is formed through composition. On the other hand, the image adjusting method used by the video display device in the four-screen display mode and the image adjusting method used by the video display device in the link mode are quite different from each other as described above.

Thus, for example, as an image adjustment selection menu using the OSD, for example, a function allowing a user to select on/off of one screen composition is included in the multi-screen display adjusting system 100 according to the first embodiment. In a case in which a user selects on, the link mode is assumed, and image adjustment is performed on one composed screen. In a case in which a user selects off, the multi-screen display mode is assumed, and image adjustment is performed on only one screen among a plurality of screens. In one example, a setting value of image adjustment is a value that is common to the case of "on" of one screen composition and the case of "off" of one screen composition. In another example, a setting value of the image adjustment in the case of "on" of one screen composition and a setting value of the image adjustment in the case of "off" of one screen composition may be different from each other. In this example, the CPU control unit 28 separately stores the setting value of the image adjustment in the case of "on" of one screen composition and the setting value of the image adjustment in the case of "off" of one screen composition in the flash ROM 29. The setting value of the image adjustment may be changed in accordance with a user's selection.

According to the multi-screen display adjusting system 100 of the first embodiment, image adjustment of videos displayed on the display panel 25 can be efficiently performed.

Hereinafter, a multi-screen display adjusting system 100 according to a second embodiment of the present invention will be described with reference to the attached drawings.

The multi-screen display adjusting system 100 according to the second embodiment is configured similar to the multi-screen display adjusting system 100 according to the first embodiment described except for points described below. Therefore, according to the multi-screen display adjusting system 100 of the second embodiment, effects similar to those of the multi-screen display adjusting system 100 according to the first embodiment described above can be acquired except for the points described below.

Figure 7:
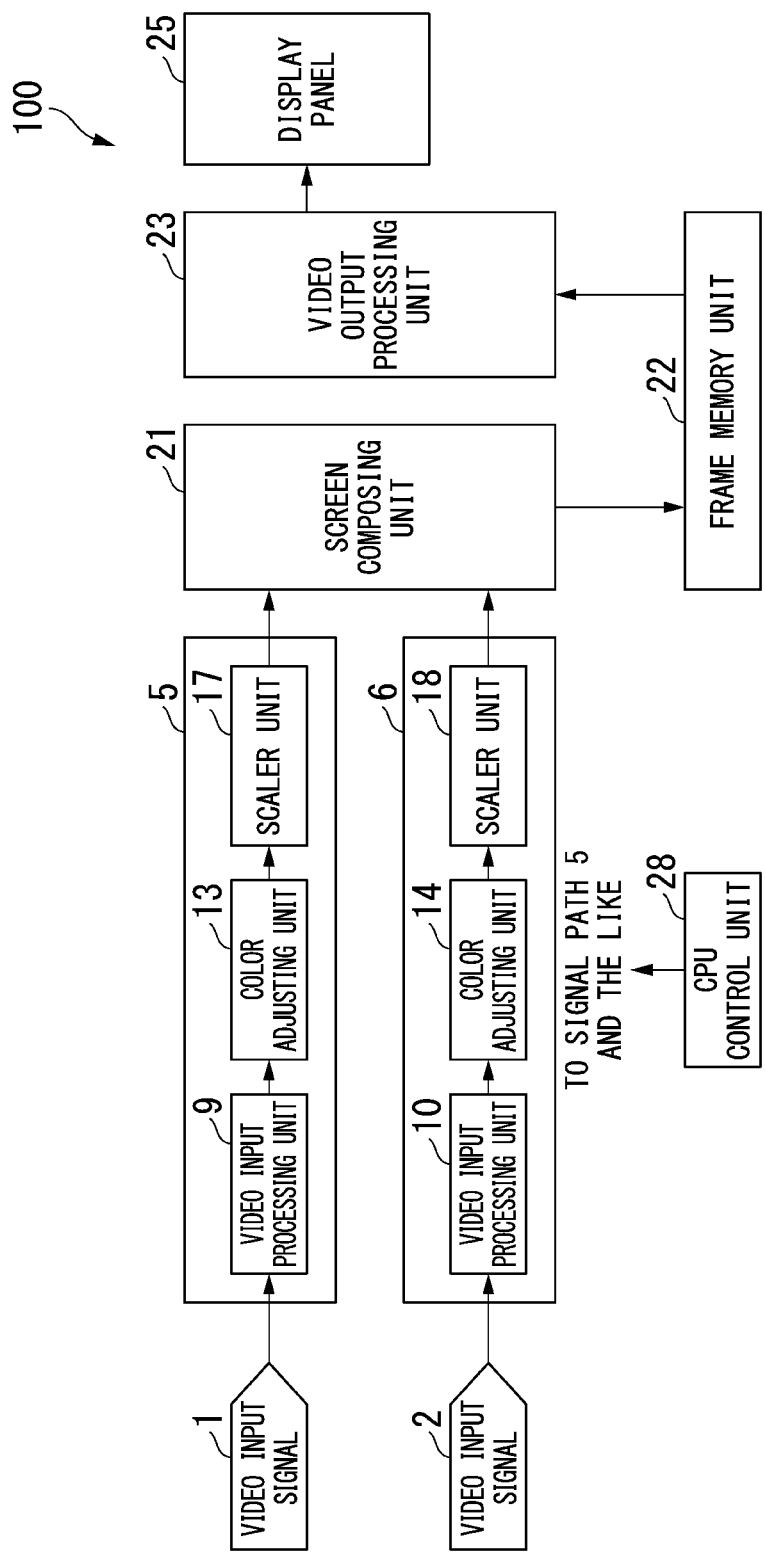
FIG. 7 is a block diagram illustrating an example of a schematic configuration of a multi-screen display adjusting system according to a second embodiment.

FIG. 7 is a block diagram illustrating an example of a schematic configuration of the multi-screen display adjusting system 100 according to the second embodiment.

In the example illustrated in FIG. 7, the multi-screen display adjusting system 100 independently includes a signal path 5 in which a video input signal 1 is input and a signal path 6 in which a video input signal 2 different from the video input signal 1 is input.

The signal path 5 includes a video input processing unit 9 that performs at least addition of blanking on a video input signal 1, a color adjusting unit 13 that performs at least adjustment of contrast on the video input signal 1, and a scaler unit 17 that performs at least size adjustment on the video input signal 1.

The signal path 6 includes a video input processing unit 10 that performs at least addition of blanking on a video input signal 2, a color adjusting unit 14 that performs at least adjustment of contrast on the video input signal 2, and a scaler unit 18 that performs at least size adjustment on the video input signal 2.

The multi-screen display adjusting system 100 further includes a display panel 25, a screen composing unit 21, a frame memory unit 22, a video output processing unit 23, and a control unit 28.

The display panel 25 displays a first screen based on the video input signal 1 and a second screen based on the video input signal 2. The screen composing unit 21 determines an arrangement of the first screen and an arrangement of the second screen on the display panel 25 on the basis of an output from the signal path 5 and an output from the signal path 6. The frame memory unit 22 stores data of the arrangement of the first screen and data of the arrangement of the second screen determined by the screen composing unit 21.

The video output processing unit 23 reads the data of the arrangement of the first screen from the frame memory unit 22 and generates a first signal timing for displaying the first screen and reads the data of the arrangement of the second screen from the frame memory unit 22 and generates a second signal timing for displaying the second screen. The control unit 28 controls the signal path 5, the signal path 6, the screen composing unit 21, and the video output processing unit 23.

As above, although forms for performing the present invention have been described using the embodiments, the present invention is not limited to such embodiments at all, and various modifications and substitutions may be applied within a range not departing from the concept of the present invention. The configurations described in the embodiments and the examples described above may be appropriately combined.

In addition, all or some of the functions of the units included in the multi-screen display adjusting system 100 according to the embodiment described above may be realized by recording a program used for realizing such functions on a computer-readable recording medium and causing a computer system to read and execute the program recorded on this recording medium. A "computer system" described here includes an OS and hardware such as peripheral devices.

In addition, a "computer-readable recording medium" represents a storage unit such as a portable medium including a flexible disk, a magneto-optical disc, a ROM, a CD-ROM, and the like, a hard disk built into a computer system, and the like. In addition, the "computer-readable recording medium" may include a medium dynamically storing the program for a short time such as a communication line in a case in which the program is transmitted via a network such as the Internet or a communication line such as a telephone line and a medium storing the program for a predetermined time such as a volatile memory inside a computer system serving as a server or a client in the case.

In addition, the program described above may be used for realizing some of the functions described above and furthermore may realize the function described above in combination with a program that has already been recorded in a computer system.

REFERENCE SIGNS LIST

1 Video input signal
2 Video input signal
3 Video input signal
4 Video input signal
5 Signal path
6 Signal path
7 Signal path 8 Signal path
9 Video input processing unit
10 Video input processing unit
11 Video input processing unit
12 Video input processing unit
13 Color adjusting unit
14 Color adjusting unit
15 Color adjusting unit
16 Color adjusting unit
17 Scaler unit
18 Scaler unit
19 Scaler unit
20 Scaler unit
21 Screen composing unit
22 Frame memory unit
23 Video output processing unit
24 Display control unit
25 Display panel
26 Remote controller
27 Remote control light receiving unit
28 CPU control unit
29 Flash ROM
30 OSD generating unit
100 Multi-screen display adjusting system

What is claimed is:

1. A multi-screen display adjusting system comprising:
at least a first signal path to which a first video input signal is input and a second signal path to which a second video input signal different from the first video input signal is input that are independent from each other;
the first signal path including:
a first video input processing unit that performs at least addition of blanking signal to the first video input signal;
a first color adjusting unit that performs at least adjustment of contrast on the first video input signal; and
a first scaler unit that performs at least size adjustment on the first video input signal,
the second signal path including:
a second video input processing unit that performs at least addition of blanking signal to the second video input signal;
a second color adjusting unit that performs at least adjustment of contrast on the second video input signal; and
a second scaler unit that performs at least size adjustment on the second video input signal,
a display panel configured to display a first screen that is an image based on the first video input signal and a second screen that is an image based on the second video input signal;
a screen composing unit configured to determine an arrangement of the first screen and an arrangement of the second screen on the display panel on the basis of an output from the first signal path and an output from the second signal path;
a frame memory unit configured to store data of the arrangement of the first screen and data of the arrangement of the second screen determined by the screen composing unit;
a video output processing unit configured to read the data of the arrangement of the first screen from the frame memory unit, generate a first signal timing that is a signal timing for displaying the first screen, read the data of the arrangement of the second screen from the frame memory unit, and generate a second signal timing that is a signal timing for displaying the second screen; and
a control unit configured to control the first signal path, the second signal path, the screen composing unit, and the video output processing unit.

2. The multi-screen display adjusting system according to claim 1, wherein the screen composing unit changes the arrangement of the first screen and the arrangement of the second screen on the display panel by rotating a display position of the first screen and a display position of the second screen on the display panel.

3. The multi-screen display adjusting system according to claim 2,
wherein the control unit performs control of the first signal path in a case in which the display position of the first screen is a predetermined position on the display panel, and
wherein the control unit performs control of the second signal path in a case in which the display position of the second screen is the predetermined position.

4. The multi-screen display adjusting system according to claim 3,
wherein, in a case in which the display position of the first screen is rotated after the control unit performs control of the first signal path in a state in which the display position of the first screen is the predetermined position, a result of image adjustment performed on the first screen when the display position of the first screen is the predetermined position is maintained also after the display position of the first screen is rotated.

5. The multi-screen display adjusting system according to claim 4, further comprising an OSD generating unit configured to generate an onscreen display menu,
wherein the OSD generating unit arranges the onscreen display menu on the display panel while avoiding the predetermined position that is the display position of the first screen in a case in which the image adjustment is performed on the first screen.

6. The multi-screen display adjusting system according to claim 3, wherein the control unit performs switching from a first state in which both the first screen and the second screen are displayed on the display panel to a second state in which only one of the first screen and the second screen is displayed on the display panel and displays a screen out of the first screen and the second screen that is arranged at the predetermined position in the first state on the display panel in the second state.

7. The multi-screen display adjusting system according to claim 1, further comprising:
a third signal path to which a third video input signal different from the first video input signal and the second video input signal is input; and
a fourth signal path to which a fourth video input signal different from the first video input signal, the second video input signal, and the third video input signal is input,
wherein the third signal path includes:
a third video input processing unit that performs at least addition of blanking signal to the third video input signal;
a third color adjusting unit that performs at least adjustment of contrast on the third video input signal; and
a third scaler unit that performs at least size adjustment on the third video input signal,
wherein the fourth signal path includes:
a fourth video input processing unit that performs at least addition of blanking signal to the fourth video input signal;

a fourth color adjusting unit that performs at least adjustment of contrast on the fourth video input signal; and
a fourth scaler unit that performs at least size adjustment on the fourth video input signal,
wherein the display panel displays the first screen, the second screen, a third screen that is an image based on the third video input signal, and a fourth screen that is an image based on the fourth video input signal,
wherein the screen composing unit determines the arrangement of the first screen, the arrangement of the second screen, an arrangement of the third screen, and an arrangement of the fourth screen on the display panel on the basis of the output from the first signal path, the output from the second signal path, an output from the third signal path, and an output from the fourth signal path,
wherein the frame memory unit stores the data of the arrangement of the first screen, the data of the arrangement of the second screen, data of the arrangement of the third screen, and data of the arrangement of the fourth screen determined by the screen composing unit,
wherein the video output processing unit generates the first signal timing, generates the second signal timing, reads the data of the arrangement of the third screen from the frame memory unit, generates a third signal timing that is a signal timing for displaying the third screen, reads the data of the arrangement of the fourth screen from the frame memory unit, and generates a fourth signal timing that is a signal timing for displaying the fourth screen, and
wherein the control unit controls the first signal path, the second signal path, the third signal path, the fourth signal path, the screen composing unit, the frame memory unit, and the video output processing unit.

8. The multi-screen display adjusting system according to claim 7, further comprising a four-screen display mode and a quad link mode,
wherein, in the four-screen display mode, only the first video input processing unit performs addition of blanking to an upper end of the first screen, a lower end of the first screen, a left end of the first screen, and a right end of the first screen, and
wherein, in the quad link mode, the first video input processing unit and the second video input processing unit perform addition of blanking to an upper end of the display panel, the third video input processing unit and the fourth video input processing unit perform addition of blanking to a lower end of the display panel, the first video input processing unit and the third video input processing unit perform addition of blanking to a left end of the display panel, and the second video input processing unit and the fourth video input processing unit perform addition of blanking to a right end of the display panel.

9. The multi-screen display adjusting system according to claim 7, further comprising a four-screen display mode and a quad link mode,
wherein, in the four-screen display mode, only the first color adjusting unit performs adjustment of contrast on the first video input signal, and
wherein, in the quad link mode, the first color adjusting unit performs adjustment of contrast on the first video input signal, the second color adjusting unit performs adjustment of contrast on the second video input signal, the third color adjusting unit performs adjustment of contrast on the third video input signal, and the fourth color adjusting unit performs adjustment of contrast on the fourth video input signal.

10. The multi-screen display adjusting system according to claim 7, further comprising a four-screen display mode and a quad link mode,
wherein, in the four-screen display mode, only the first scaler unit performs size adjustment on the first video input signal, and
wherein, in the quad link mode, the first scaler unit performs size adjustment on the first video input signal, the second scaler unit performs size adjustment on the second video input signal, the third scaler unit performs size adjustment on the third video input signal, and the fourth scaler unit performs size adjustment on the fourth video input signal.

11. A multi-screen display adjusting method comprising:
performing at least addition of blanking, at least adjustment of contrast, and at least size adjustment on a first video input signal input to a first signal path;
performing at least addition of blanking, at least adjustment of contrast, and at least size adjustment on a second video input signal different from the first video input signal input to a second signal path;
displaying a first screen that is an image based on the first video input signal and a second screen that is an image based on the second video input signal on a display panel;
determining an arrangement of the first screen and an arrangement of the second screen on the display panel on the basis of an output from the first signal path and an output from the second signal path;
storing data of the determined arrangement of the first screen and data of the determined arrangement of the second screen in a frame memory unit;
reading the data of the arrangement of the first screen from the frame memory unit, generating a first signal timing that is a signal timing for displaying the first screen, reading the data of the arrangement of the second screen from the frame memory unit, and generating a second signal timing that is a signal timing for displaying the second screen; and
performing control of the first signal path, control of the second signal path, control of determination of the arrangement of the first screen and the arrangement of the second screen, and control of generation of the first signal timing and generation of the second signal timing.

* * * * *